United States Patent Office 3,365,384
Patented Jan. 23, 1968

3,365,384
REMOVAL OF SUSPENDED MINERAL MATTER FROM ASPHALTIC PETROLEUM OILS
David Samuel Pasternack, Edmonton, Alberta, Canada, assignor to Canadian Patents and Development Limited, Ottawa, Ontario, Canada, a corporation of Canada
No Drawing. Filed Oct. 26, 1964, Ser. No. 406,560
5 Claims. (Cl. 208—11)

This invention relates to the removal of suspended mineral matter, containing particles of colloidal or near-colloidal dimensions, from high-viscosity petroleum oils and residues.

A method is provided for utilizing impure high-viscosity petroleum oils, particularly asphaltic oils, and residues from such oils, for the production of low-ash asphalt which would be suitable, from the standpoint of ash content, for the production of low-ash coke for metallurgical purposes including electrode carbon. The procedure is especially useful for the production of low-ash asphalt from the impure virgin oil obtained from the Athabasca oil sands of Alberta, Canada, by any water-washing process followed by dehydration, as no economical prior method is known to exist. Solvent extraction is expensive and a portion of the fine clay solids shows up in the extract.

Suitable feed material includes not only the virgin oil separated from the Athabasca oil sands of Alberta by a water-washing method and dehydrated, but also other similar impure high-viscosity petroleum oils, for instance from Lloydminster Saskatchewan, Trinidad and California, and residues from such oils.

The dehydrated virgin oil from the Athabasca oil sands of Alberta contains varying percentages of suspended mineral matter, depending on the experimental conditions used in the water-washing method of separation. Much of this suspended mineral matter is clay ranging down to colloidal or near-colloidal dimensions, which cannot be removed by filtration even at a temperature of 650° F. because of almost instantaneous clogging of the filtering medium, and which cannot be removed to a satisfactory extent by centrifuging because the virgin oil is still much too viscous at operable temperatures; for example, at room temperature the virgin Athabasca oil has the consistency of molasses, and an A.P.I gravity of about 8.5°. Coking of this virgin oil produces a coke product which yields from about 3% ash to over 20%, depending on the recovery conditions. Coke for metallurgical use requires an ash content less than 0.5%, and for electrode carbon use a much lower ash content is required.

In the present invention the high-viscosity oil or residue is subjected to controlled thermal-cracking at atmospheric pressure or under a slight vacuum. This is followed by filtration of the hot residual oil through a filter maintained at a suitable temperature to prevent congealing of the residual oil and permit rapid and complete filtration. Desirably the filter temperature is low enough so that additional thermal cracking does not take place in the pores of the filter, e.g. less than about 650° F. The filtration may be carried out either under vacuum or under pressure. Centrifuging is possible in some instances as discussed below.

Preferably the feed material is subjected to controlled thermal-cracking at atmospheric pressure (or under a slight vacuum provided that excessive frothing does not occur), with simultaneous removal of the hydrocarbon vapours and gases which are produced, until an adequate amount of thermal cracking has occurred. An adequate amount of thermal cracking has occurred when the hot residual oil will filter rapidly and completely by conventional means through a hot filtering medium and still provide a low-ash filtrate. Generally some advantage in separating the solids is obtained when distillate formation is within the range 20-60% by weight of the pure oil in the feed. This corresponds to free carbon formation of from about 0.2 to about 3.0 wt. percent based on pure oil in the feed.

The term "free carbon" here represents the nonmineral constituents which are formed in the oil during the thermal cracking and are not in solution in the residual oil at elevated temperature (e.g. about 600 to 650° F.) and which, when the residual oil is filtered at that temperature, are retained on a No. 1 Whatman filter paper (or equivalent) as part of the solids.

The filtering medium need have a porosity only fine enough to retain all the extraneous solids during the rapid and complete filtration, and usually need not be finer than that exemplified by a No. 1 Whatman filter paper. The filters may be of any conventional type which operate either under vacuum or under pressure, have means of maintaining the required temperature during the filtration, permit rapid and complete filtration of the hot residual oil, and remove all suspended solids. The filtration may be either continuous or batch, whichever is more economical.

For the virgin Athabasca oil, which only begins to crack rapidly at a temperature of about 665° F. at atmospheric pressure, it is necessary to progressively increase the liquid temperature to at least about 760° F. at atmospheric pressure during a slow thermal cracking requiring about two hours or more (or equivalent heat treatment, for instance to at least about 790° F. at atmospheric pressure during a comparatively rapid thermal cracking requiring about 40 minutes) to attain an adequate amount of thermal cracking for the purposes of the invention. The preferred maximum liquid temperature range for the Athabasca oil is about 760° to 830° F. at atmospheric pressure, although this should not be considered as limiting as it depends on the rate, the extent, and the duration of the thermal cracking. Bearing in mind that the rapidity and completeness of the filtration and the desired purity of the filtrate are the overriding features in the invention, the desired extent of thermal cracking for the Athabasca oil is represented by about 25 to about 55, preferably about 30 to 50 weight percent of distillate recovery based on the pure oil in the feed. This distillate recovery is equivalent to formation of about 0.3 to 2.0 weight percent free carbon based on the oil in the feed. The duration of the cracking treatment may vary from somewhat less than 40 minutes to many hours depending on the desired throughput and purity of the product and economic considerations. The maximum liquid temperature is adjusted accordingly, i.e. inversely with the time. When an adequate amount of thermal cracking has occurred the particles of suspended solids have all become large enough to be retained on the filter, either through agglomeration or through serving as nuclei for at least a portion of the free carbon which is produced during the thermal cracking.

When only 10 weight percent of distillate has been obtained from the virgin Athabasca oil, the temperature of the residual oil in the cracking chamber is over 700° F., but less than 10 percent of the possible pure filtrate passes through the hot (No. 1 Whatman) filter before complete clogging occurs. Above 20% by weight distillate separation, significant advantages in filtration are realized. With about 30 weight percent (or more) of distillate recovery, subsequent filtration goes rapidly to completion if the filter is maintained sufficiently hot, and the filtration accomplishes the complete removal of all extraneous solids present in the residual oil.

The permissible upper limit of distillate recovery may vary somewhat and depends on the rapidity and completeness of filtration of the residual oil at the temperature of filtration, provided that substantially all suspended solids are removed. If an excessive percentage of distillate has been produced, the residual oil will be too viscous at the temperature of filtration to filter rapidly or completely. Congealing of the residual oil during the filtration must be avoided.

The filtrates obtained from the virgin Athabasca oil by the above procedure are low-ash asphalts containing about 0.1 to 0.12 weight percent of ash. Coke produced from the filtrates would have an ash content of about 0.33 to 0.47 percent which, from an ash standpoint, would be suitable for metallurgical purposes but not for the manufacture of electrode carbon. Only the small amounts of metal in actual chemical combination with the oil are believed to pass through the (No. 1 Whatman) filter.

Subsequent to achieving an adequate amount of thermal cracking, one preferred variation of the invention is to dilute the residual oil with a diluent (which may be distillate from the thermal cracking or a fraction thereof, or equivalent), and then to filter the diluted material by conventional means, either by pressure or under vacuum, through a filtering medium the porosity of which is satisfactory for the retention of substantially all suspended solids (including precipitated material) and at the same time provides a rapid and complete filtration. Preferably one or more volumes of diluent is used per volume of oil, with both diluent and oil being warm. (Centrifuging may be employed for the diluted oil instead of filtration, provided it accomplishes the removal of the solids to a satisfactory degree. The undiluted hot oil is too viscous for satisfactory centrifuging.) The diluent is then removed by conventional means. By this procedure the ash content of the diluent extract, following removal of the diluent, is very low. Subsequent to a comparatively rapid thermal cracking of the virgin Athabasca oil, coke produced from the extract has an ash content of less than 0.2 percent. Subsequent to a slow thermal cracking of the virgin Athabasca oil, coke produced from the extract has an ash content of about 0.1 percent or less and could be as low as 0.02 percent, and from an ash standpoint would be suitable for the manufacture of electrode carbon.

The diluent may be any low-viscosity hydrocarbon liquid. The total distillate from the thermal cracking, or a fraction thereof, is the preferred diluent.

Subsequent to achieving an adequate amount of thermal cracking, a second preferred variation of the invention is to filter the hot residual oil and then dilute the filtrate with diluent. Preferably one or more volumes of warm diluent is added to the warm filtrate. The diluted filtrate is then filtered or centrifuged to separate insolubles. This procedure results in the production of the same low-ash extracts as does the first variation, but, in addition, permits the recovery of the diluent-insolubles in a pure state instead of being mixed with extraneous solids (including some free carbon). These diluent-insolubles may be separately processed further.

The filter temperature of the undiluted residual oil should be maintained just hot enough to pass the treated oil quickly, but less than about 650° F.—or the temperature at which significant additional thermal cracking begins to occur in the pores of the filter.

Examples of the procedure of the invention are as follows:

Example 1

Dehydrated Athabasca oil-sands oil (obtained by a warm-water washing method) was heated slowly at atmospheric pressure from 650° F. to about 775° F. in a period of about 3.5 hours until about 40 weight percent of distillate was obtained. The hot residual oil was then filtered rapidly and completely by passing under a vacuum of 27 inches, through a hot filtering medium composed of a No. 1 Whatman filter paper on a Buechner funnel suitably preheated and kept hot during the filtration. The temperature of the filter medium was about 600° F. The solids in the filter cake consisted of 78% clay and 22% free carbon, and were oil-wet. A low-ash filtrate, with an ash content of about 0.11 weight percent was obtained. (Coke produced from this filtrate by heating in a Ramsbottom furnace at 1020° F. for 20 minutes had an ash content of about 0.28 percent.)

Example 2

The same dehydrated Athabasca oil-sands oil was heated comparatively rapidly at atmospheric pressure from 650° F. to about 820° F. in a period of about 40 minutes until about 40 weight percent of distillate was obtained. The hot residual oil was then filtered rapidly and completely similarly to Example 1. The solids in the filter cake consisted of 85% clay and 15% "free carbon," and were oil-wet. A low-ash filtrate, with an ash content of about 0.12 weight percent, was obtained. (Coke produced from this filtrate by heating in a Ramsbottom furnace at 1020° F. for 20 minutes had an ash content of about 0.45 percent.)

Examples of preferred variants of the process (using a diluent) are as follows:

Example 3

The warm unfiltered residual oil from Example 1 was diluted with about two to three volumes of warm diluent (the diluent was the portion of the distillate from the thermal cracking with a boiling range from 325° to 525° F.) The diluted residual was filtered rapidly and completely while under a vacuum of 27 inches, through a filtering medium composed of a No. 1 Whatman filter paper on a Buechner funnel, giving retention of all suspended solids (including the precipitated material). The filter temperature was about 250° F. The diluent-free filter cake consisted of 15% clay, 4% free carbon, and 81% diluent-insoluble material. Upon removal of the diluent by distillation, the extract showed an ash content of about 0.011 weight percent. (Coke produced from this extract by heating in a Ramsbottom furnace at 1020° F. for 20 minutes had an ash content of about 0.07 percent.)

Example 4

The warm unfiltered residual oil from Example 2 was diluted with about two to three volumes of warm diluent. The diluent was the portion of the distillate from the thermal cracking with a boiling range from 325° to 525° F. Rapid and complete filtration was obtained using a vacuum of 27 inches, through a filtering medium composed of a No. 1 Whatman filter paper on a Buechner funnel, giving retention of all suspended solids (including precipitated material). The filter temperature was about 250° F. The diluent-free filter cake consisted of 20% clay, 4% free carbon, and 76% diluent-insoluble material. Upon removal of the diluent by distillation, the extract showed an ash content of about 0.016 weight percent. (Coke produced from this extract by heating in a Ramsbottom furnace at 1020° F. for 20 minutes had an ash content of about 0.11 percent.)

Example 5

The warm filtrate from Example 1 was diluted with about two to three volumes of warm diluent and filtered rapidly and completely under a vacuum of 27 inches, through a filtering medium consisting of a No. 1 Whatman filter paper on a Buechner funnel. The porosity of the filter medium was satisfactory for the retention of all precipitated material. The temperature of the filter medium was about 250° F. The extract was substantially identical to that obtained in Example 3. The diluent consisted of the portion of the distillate from the thermal cracking with a boiling range from 325° to 525° F. The diluent-free filter cake consisted entirely of diluent-insoluble material.

Example 6

The warm filtrate from Example 2 was diluted with about two to three volumes of warm diluent consisting of the portion of the distillate from the thermal cracking with a boiling range from 325° to 525° F. The resultant filtered rapidly and completely under a vacuum of 27 inches, through a filtering medium consisting of a No. 1 Whatman filter paper on a Buechner funnel, which retained all precipitated material. The diluent-free filter cake consisted entirely of diluent-insoluble material. The extract was substantially identical to that obtained in Example 4.

Example 7

The same dehydrated oil-sands oil as for Example 1 was heated slowly at atmospheric pressure from 650° F. to about 795° F. in a period of about 6 hours until about 53.5 weight percent of distillate was obtained. The hot residual oil was then filtered rapidly and completely by passing under a vacuum of 27 inches, through a hot filtering medium composed of a No. 1 Whatman filter paper on a Buechner funnel suitably preheated and kept hot during the filtration. The solids in the filter cake consisted of 56% clay and 44% free carbon, and were oil-wet. A low-ash filtrate, with an ash content of about 0.12 weight percent was obtained. (Coke produced from this filtrate by heating in a Ramsbotom furnace at 1020° F. for 20 minutes had an ash content of about 0.25 percent.) The temperature of the filter medium was about 650° F.

Example 8

The warm unfiltered residual oil from Example 7 was diluted with about two to three volumes of warm diluent (the diluent was the portion of the distillate from the thermal cracking with a boiling range from 325° to 525° F.) and filtered rapidly and completely while under a vacuum of 27 inches, through a filtering medium composed of a No. 1 Whatman filter paper on a Buechner funnel, giving retention of all suspended solids (including the precipitated material). The filter temperature was about 250° F. The diluent-free filter cake consisted of 8% clay, 6% free carbon, and 86% diluent-insoluble material. Upon removal of the diluent by distillation, the extract showed an ash content of about 0.006 weight percent. (Coke produced from this extract by heating in a Ramsbottom furnace at 1020° F. for 20 minutes had an ash content of about 0.02 percent.)

Example 9

The warm filtrate from Example 7 was diluted with about two or three volumes of warm diluent and filtered rapidly and completely under a vacuum of 27 inches, through a filtering medium consisting of a No. 1 Whatman filter paper on a Buechner funnel. The porosity of the filter medium was satisfactory for the retention of all precipitated material. The temperature of the filter medium was about 250° F. The extract was substantially identical to that obtained in Example 8. The diluent consisted of the portion of the distillate from the thermal cracking with a boiling range from 325° to 525° F. The diluent-free filter cake consisted entirely of diluent-insoluble material.

Example 10

The same dehydrated oil-sands oil as for Example 1 was heated slowly at atmospheric pressure from 650° F. to about 770° F. in a period of about 2 hours until about 30 weight percent of distillate was obtained. The hot residual oil was then filtered rapidly and completely by passing under a vacuum of 27 inches, through a hot filtering medium composed of a No. 1 Whatman filter paper on a Buechner funnel suitably preheated and kept hot during the filtration. The solids in the filter cake consisted of 91% clay and 9% free carbon, and were oil-wet. A low-ash filtrate, with an ash content of about 0.10 weight percent was obtained. (Coke produced from this filtrate by heating in a Ramsbottom furnace at 1020° F. for 20 minutes had an ash content of about 0.46 percent.) The temperature of the filter medium was about 600° F.

Example 11

The warm unfiltered oil from Example 10 was diluted with about two to three volumes of warm diluent (the diluent was the portion of the distillate from the thermal cracking with a boiling range from 325° to 525° F.) and filtered rapidly and completely while under a vacuum of 27 inches, through a filtering medium composed of a No. 1 Whatman filter paper on a Buechner funnel, giving retention of all solids (including the precipitated material). The filter temperature was about 250° F. The diluent-free filter cake consisted of 24% clay, 3% free carbon, and 73% diluent-insoluble material. Upon removal of the diluent by distillaiton, the extract showed an ash content of about 0.013 weight percent. (Coke produced from this extract by heating in a Ramsbottom furnace at 1022° F. for 20 minutes had an ash content of about 0.10 percent.)

Example 12

The warm filtrate from Example 10 was diluted with about two or three volumes of warm diluent and filtered rapidly and completely under a vacuum of 27 inches, through a filtering medium consisting of a No. 1 Whatman filter paper on a Buechner funnel. The porosity of the filter medium was satisfactory for the retention of all precipitated material. The temperature of the filter medium was about 250° F. The extract was substantially identical to that obtained in Example 11. The diluent consisted of the portion of the distillate from the thermal cracking with a boiling range of from 325° to 525° F. The diluent-free filter cake consisted entirely of diluent-insoluble material.

I claim:

1. A method of producing low-ash asphalt from the high-viscosity asphaltic natural tar separated from tar sands by any water-washing method followed by dehydration of the separated tar, and which retains silt and clay of colloidal or near-colloidal size which will not settle out or be filtered out at temperatures up to coking temperature; comprising thermally cracking the dehydrated tar, at atmospheric pressure or under a slight vacuum at from about 650° F. up to a maximum of about 830° F. until about 0.2 to about 3 weight percent of free carbon has been formed based on the organic material in the feed during a residence time of about 40 minutes to about 6 hours whereby said silt and clay become filterable, separating filterable solids by filtering from the residual asphaltic material at elevated temperatures below those causing appreciable thermal cracking and recovering (as filtrate) commercial quantities of low-ash asphalt with an ash-content not significantly greater than approximately 0.12% containing only metal impurities in actual chemical combination with the organic materials and an ash-containing residue.

2. The method of claim 1 wherein from about 20 to about 60 weight percent of distillate, based on the organic material in the feed, is produced by the thermal cracking at atmospheric pressure or under a slight vacuum and the resulting asphaltic residue filtered at up to about 600° F. to about 700° F.

3. The method of claim 2 wherein the filtered residual asphaltic material is diluted with distillate from the thermal cracking with a boiling range from about 325° F. to about 525° F. and then filtered or centrifuged and the diluent distilled off from the filtrate to yield commercial quantities of very low-ash asphalt containing up to about 0.02% ash, the distillate serving as a selective solvent in that it retains in solution unpolymerized asphaltic material which remains in the residual asphaltic material at the conclusion of the partial thermal-cracking.

4. The method of claim 3 wherein the diluent-insoluble phase, which contains as ash-forming constituents only metals in actual chemical combination with the organic material, is recovered.

5. The method of claim 2 wherein the residual asphaltic material from the thermal cracking is diluted with distillate from the thermal cracking with a boiling range from about 325° F. to about 525° F. and then filtered or centrifuged and the diluent distilled off from the filtrate to yield commercial quantities of very low-ash asphalt containing up to about 0.02% ash, the distillate serving as a selective solvent in that it retains in solution unpolymerized asphaltic material which remains in the residual asphaltic material at the conclusion of the partial thermal-cracking.

References Cited

UNITED STATES PATENTS

| 3,095,368 | 6/1963 | Bieber et al. | 208—251 |
| 3,151,054 | 9/1964 | Layng | 208—11 |
| 2,696,458 | 12/1954 | Strickland | 208—86 |

OTHER REFERENCES

Blair; "Report on the Alberta Bituminous Sands," Dec. 12, 1960, Pub. Government of the Province of Alberta, pages 41 to 50.

HERBERT LEVINE, *Primary Examiner.*

DELBERT E. GANTZ, *Examiner.*